US00RE35942E

United States Patent [19]

Boot et al.

[11] E Patent Number: Re. 35,942

[45] Reissued Date of Patent: Nov. 3, 1998

[54] BRICK PLACING MACHINE

[75] Inventors: Phillip Boot, Nth. Turramura; Dare Hurst; Robert Lasseter, both of New South Wales, all of Australia

[73] Assignee: Panelbrick Industries Pty. Ltd., New South Wales, Australia

[21] Appl. No.: 609,231

[22] Filed: Mar. 1, 1996

Related U.S. Patent Documents

Reissue of:

[64] Patent No.: 5,016,419
Issued: May 21, 1991
Appl. No.: 366,923
Filed: Jun. 16, 1989

Related U.S. Application Data

[63] Continuation of PCT/AU88/00305, Aug. 16, 1988.

[30] Foreign Application Priority Data

Aug. 17, 1987 [AU] Australia ..... PI 3786

[51] Int. Cl.[6] ..... B65G 61/00

[52] U.S. Cl. ..... 52/749.14; 52/747.1; 52/747.12; 52/749.1; 156/182; 414/10

[58] Field of Search ..... 52/749.1, 749.14, 52/747.1, 747.12; 156/182, 559; 414/10

[56] References Cited

U.S. PATENT DOCUMENTS

| | | | |
|---|---|---|---|
| 3,834,973 | 9/1974 | Kummerow | 52/749.14 X |
| 3,933,570 | 1/1976 | Wright et al. | 52/749.14 X |
| 4,067,766 | 1/1978 | Langer | 52/749.14 X |
| 4,133,097 | 1/1979 | Slade | 52/749.14 X |

FOREIGN PATENT DOCUMENTS

| | | |
|---|---|---|
| 44004/68 | 4/1979 | Australia . |
| 50434/85 | 6/1986 | Australia . |
| 59628/86 | 12/1986 | Australia . |
| 71832/87 | 10/1987 | Australia . |
| 514376 | 3/1921 | France . |
| 168718 | 9/1921 | United Kingdom . |

*Primary Examiner*—Winnie S. Yip
*Attorney, Agent, or Firm*—Nikaido Marmelstein Murray & Oram LLP

[57] ABSTRACT

A brick placing machine consisting of a horizontally disposed substantially rectangular rectangle the length of which corresponds approximately to the maximum width or height of any brick panel to be formed, a substantially horizontal mould on which a brick panel can be formed arranged adjacent to the receptacle the receptacle being constructed to receive bricks constituting part of a panel, the bricks being arranged in the receptacle in a configuration in which they are to be placed on the mould, the receptacle having in it clamps for clamping the bricks in their correct relative positions with appropriate spaces between bricks and between courses of bricks for the reception of mortar, the receptacle being movable to a position over the mould in which position the clamps are released to leave the bricks on the mould in the desired position, the receptacle then being moved clear of the bricks placed on the mould and moved relative to the mould so that the receptacle can be suitable refilled with bricks and the cycle repeated until a brick panel of the desired configuration is assembled on the mould. It is preferred that the receptacle is mounted pivotably about one end and is moved over the mould be pivoting about its pivotal axis to bring the faces of the bricks held in the receptacle face downwardly onto the mould.

7 Claims, 14 Drawing Sheets

BRICK PLACING MACHINE

Matter enclosed in heavy brackets [ ] appears in the original patent but forms no part of this reissue specification; matter printed in italics indicates the additions made by reissue.

This application is a continuation of International Application No. PCT/AU88/00305 filed Aug. 16, 1988.

The present invention relates to a machine for placing bricks accurately in a mould for the production of a brick panel intended for use as the wall or part of the wall of a building.

It has been proposed that brick panels should be produced by laying bricks in position in a mould consisting essentially of a flat surface having surrounding side walls. Reinforcement is then inserted through the bricks and mortar poured into the spaces left between courses of bricks so as to fill those spaces and enter holes passing through the bricks. For this purpose it is necessary that the bricks are placed very accurately in the mould and hitherto this has been done entirely by hand. This is a relatively costly and time consuming activity and various problems arise in gaining adequate access to the whole area of the mould particularly in the case of moulds intended for the production of large panels that are either very high and narrow, e.g., up to eight meters high and 3.5 meters wide, or alternatively very wide, e.g., of up to eight meters wide and 3.5 meters high. To achieve this the method chosen must be able to locate or position the bricks on the mould in either direction (i.e., parallel or at 90° to the mould length) thus giving the required flexibility for variable panel configurations.

The object of the present invention is to provide a brick placing machine which, while not eliminating hand work entirely considerably simplified it and enables bricks to be placed in a mould in either direction more rapidly than if the whole operation were done by hand.

The present invention consists in a brick placing machine consisting of a horizontally disposed substantially rectangular receptacle the length of which corresponds approximately to the maximum width or height of any brick panel to be formed, a horizontal mould on which a brick panel can be formed arranged adjacent the receptacle, the receptacle being adapted to receive bricks constituting part of the panel, arranged in a configuration in which they are to be placed on the mould, there being means in the receptacle for locating each brick precisely in its correct position with appropriate spaces between bricks and between courses of bricks for the reception of mortar, means to clamp the bricks in the receptacle in their correct relative positions, means to move the receptacle over the mould and means to release the bricks so that the bricks are placed on the mould in the desired position, means to move the receptacle clear of bricks placed on the mould, means to produce relative movement between the receptacle and the mould whereby the receptacle can be refilled and a complete panel of brick work can be built up on the mould by repeated filling of the receptacle with bricks and placing the bricks in the mould.

In order that the nature of the invention may be better understood a preferred form thereof is hereinafter described by way of example with reference to the accompanying drawings in which.

Figure 6:
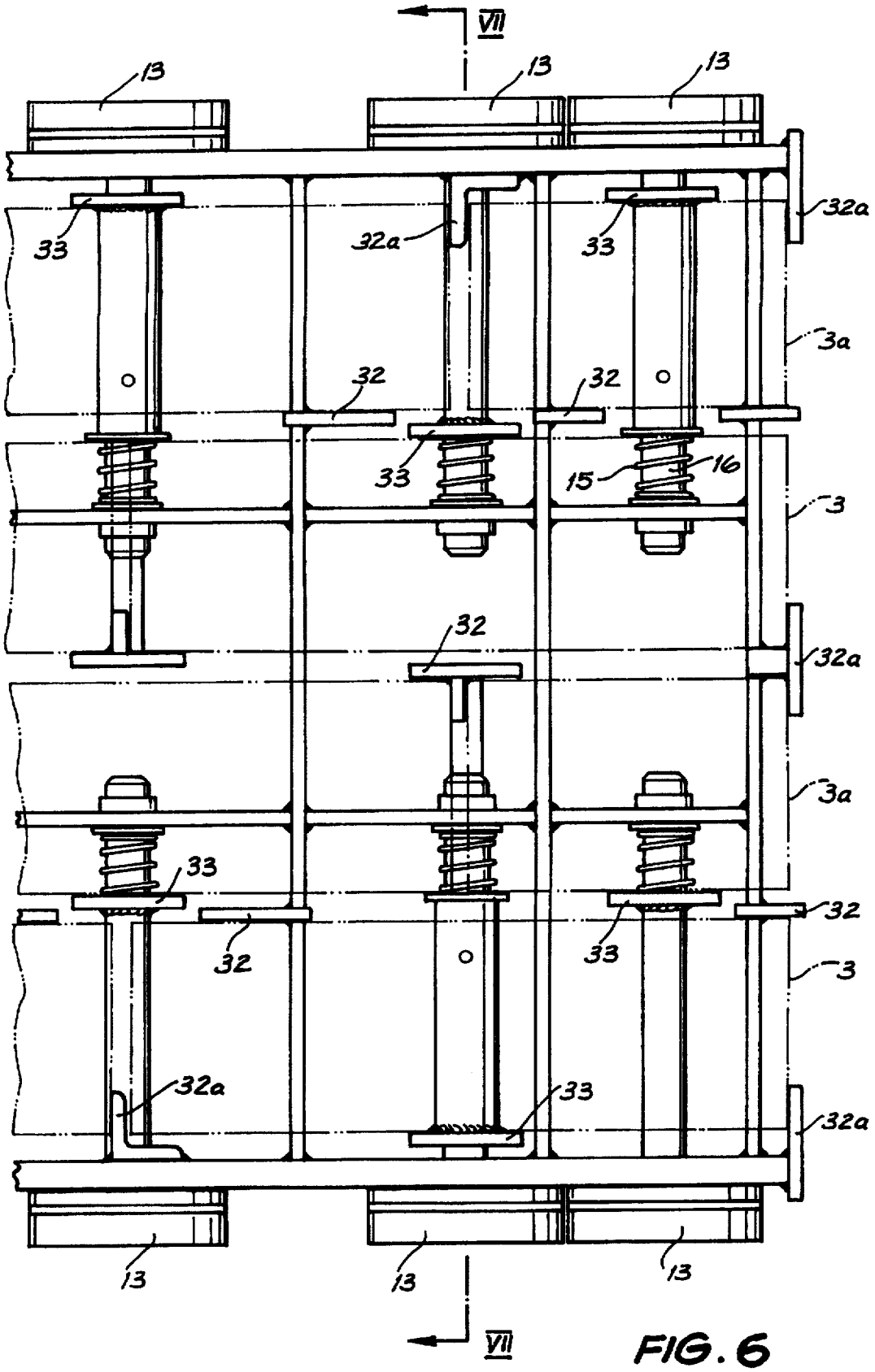
Figure 7:
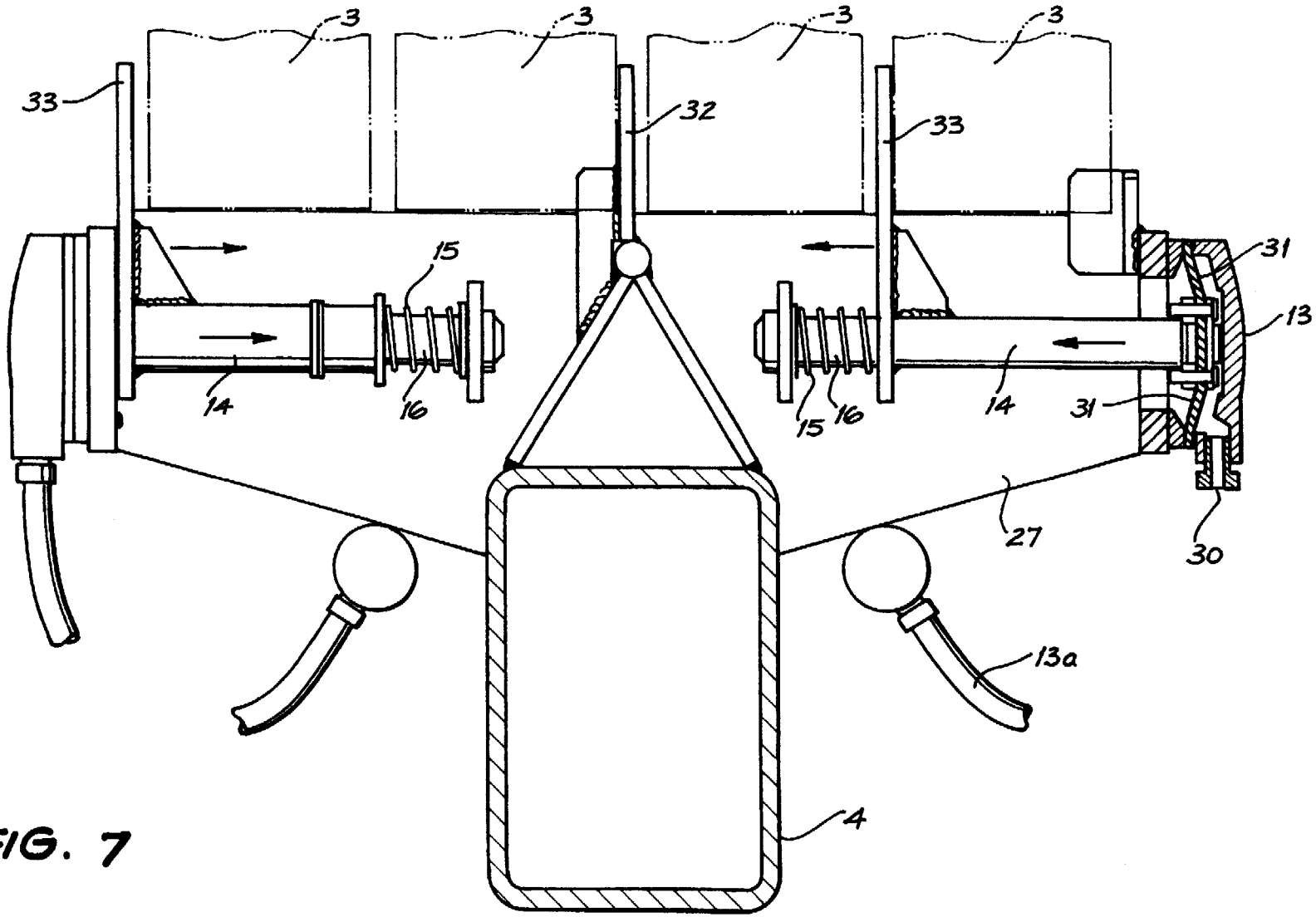
Figure 8:
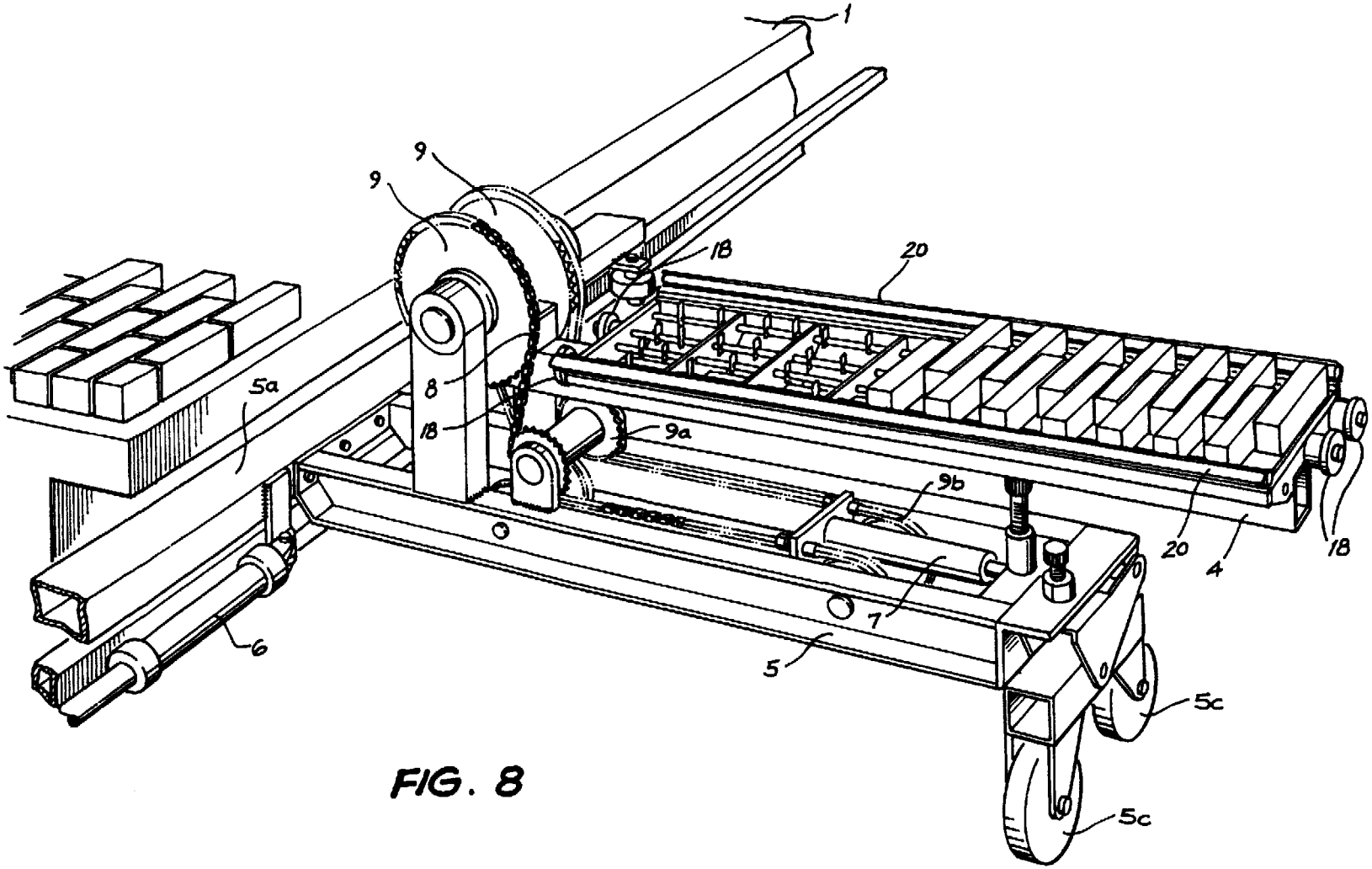
Figure 9:
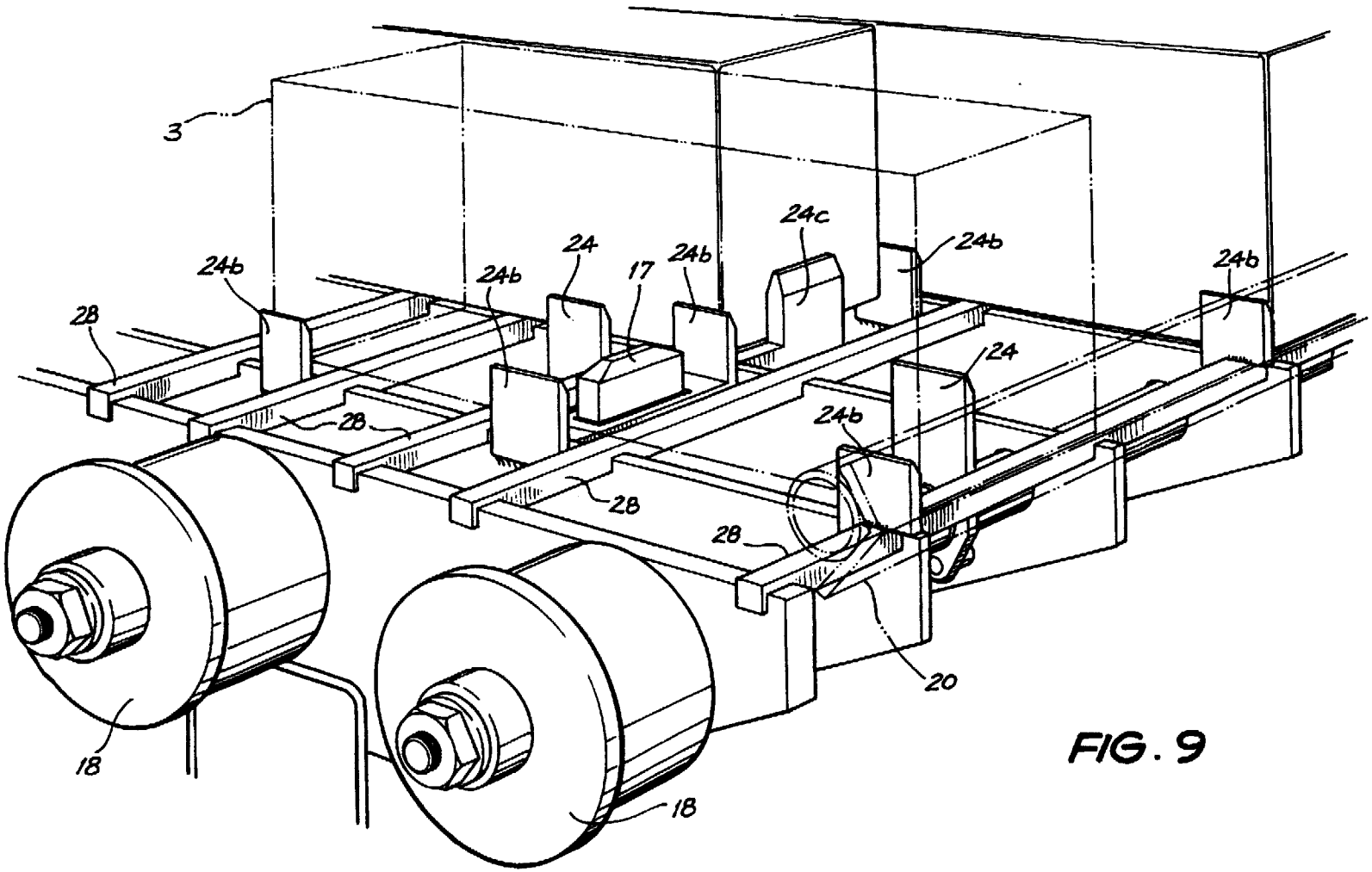
Figure 10:
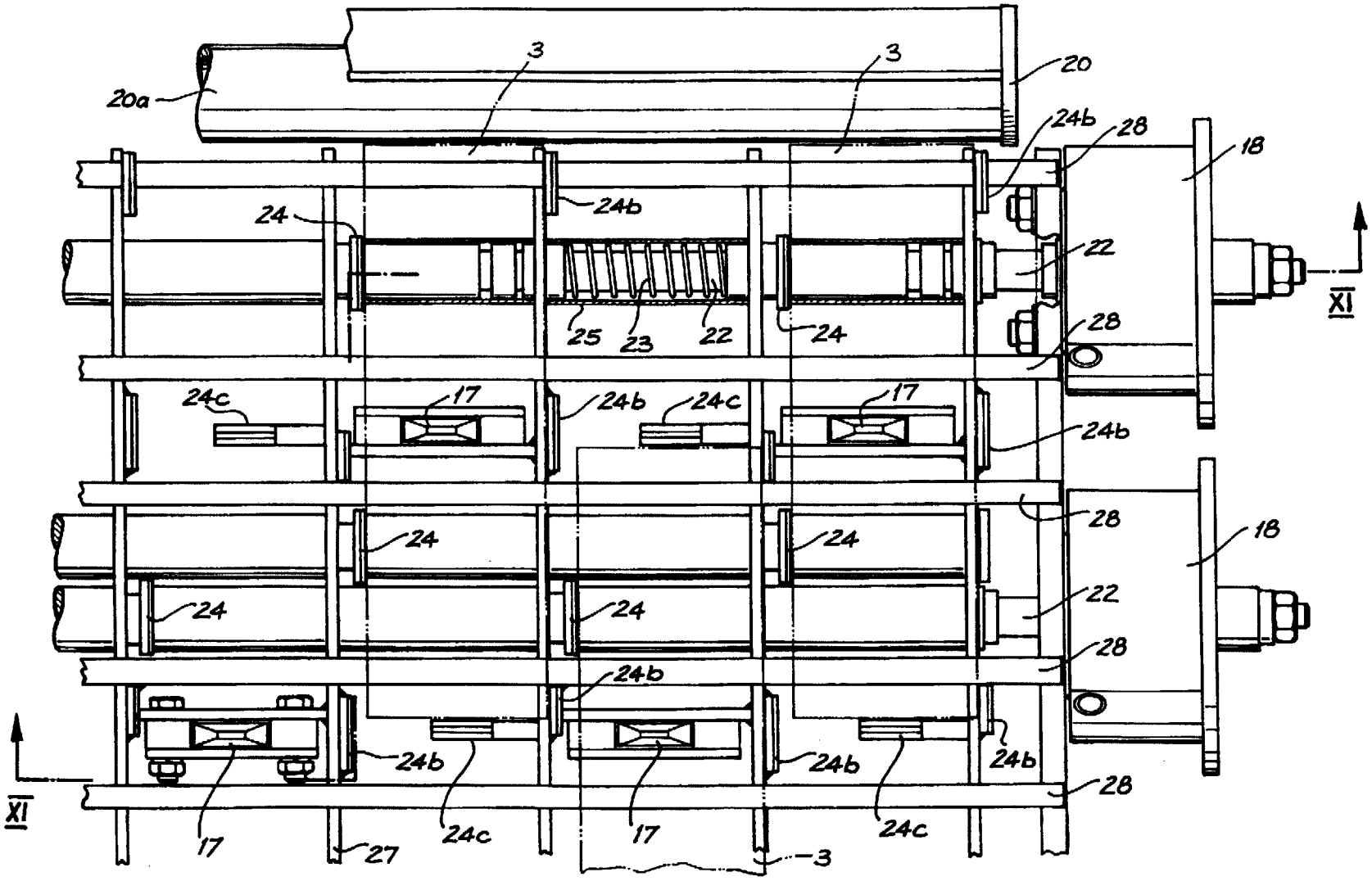
Figure 11:
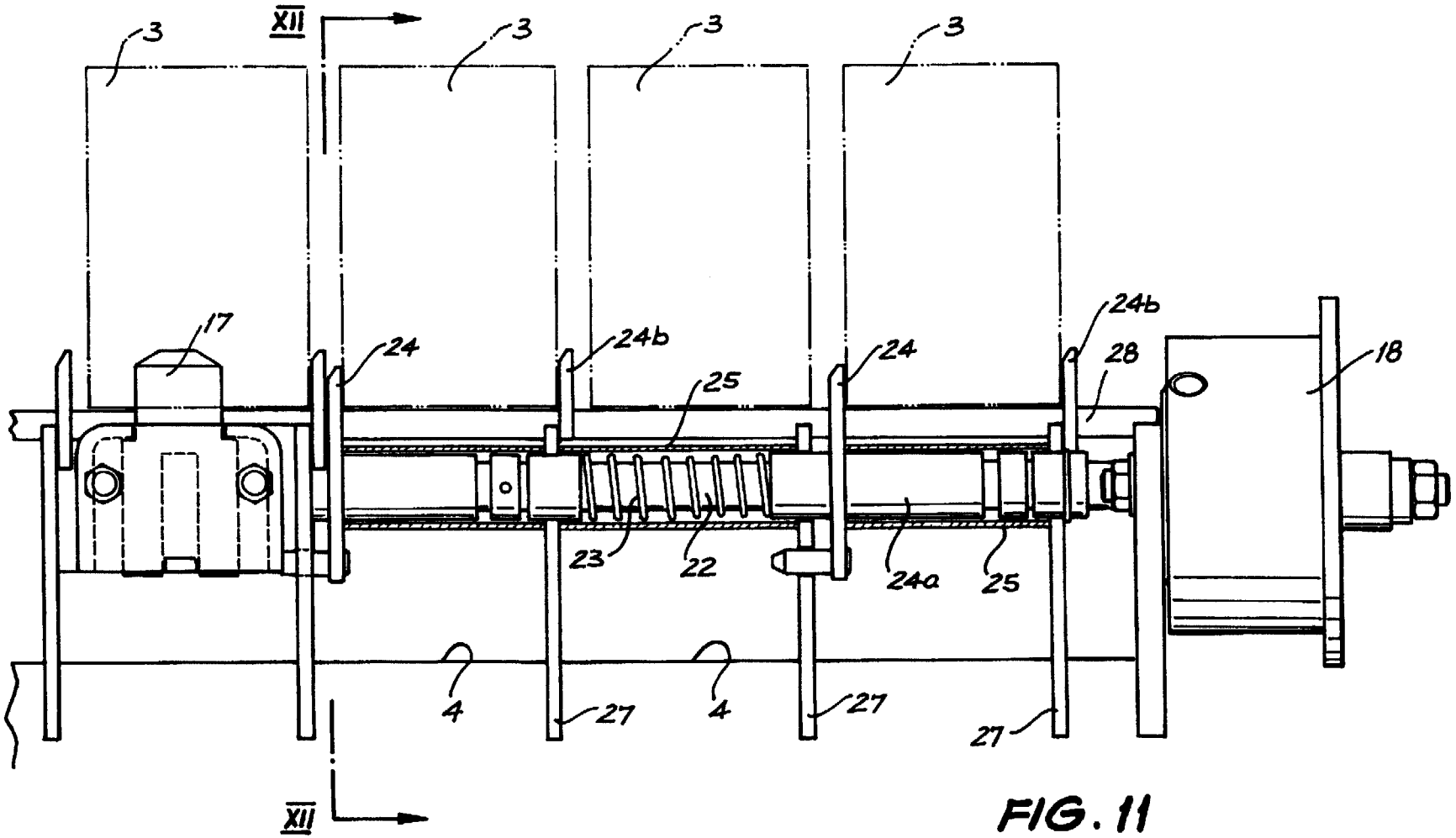
Figure 12:
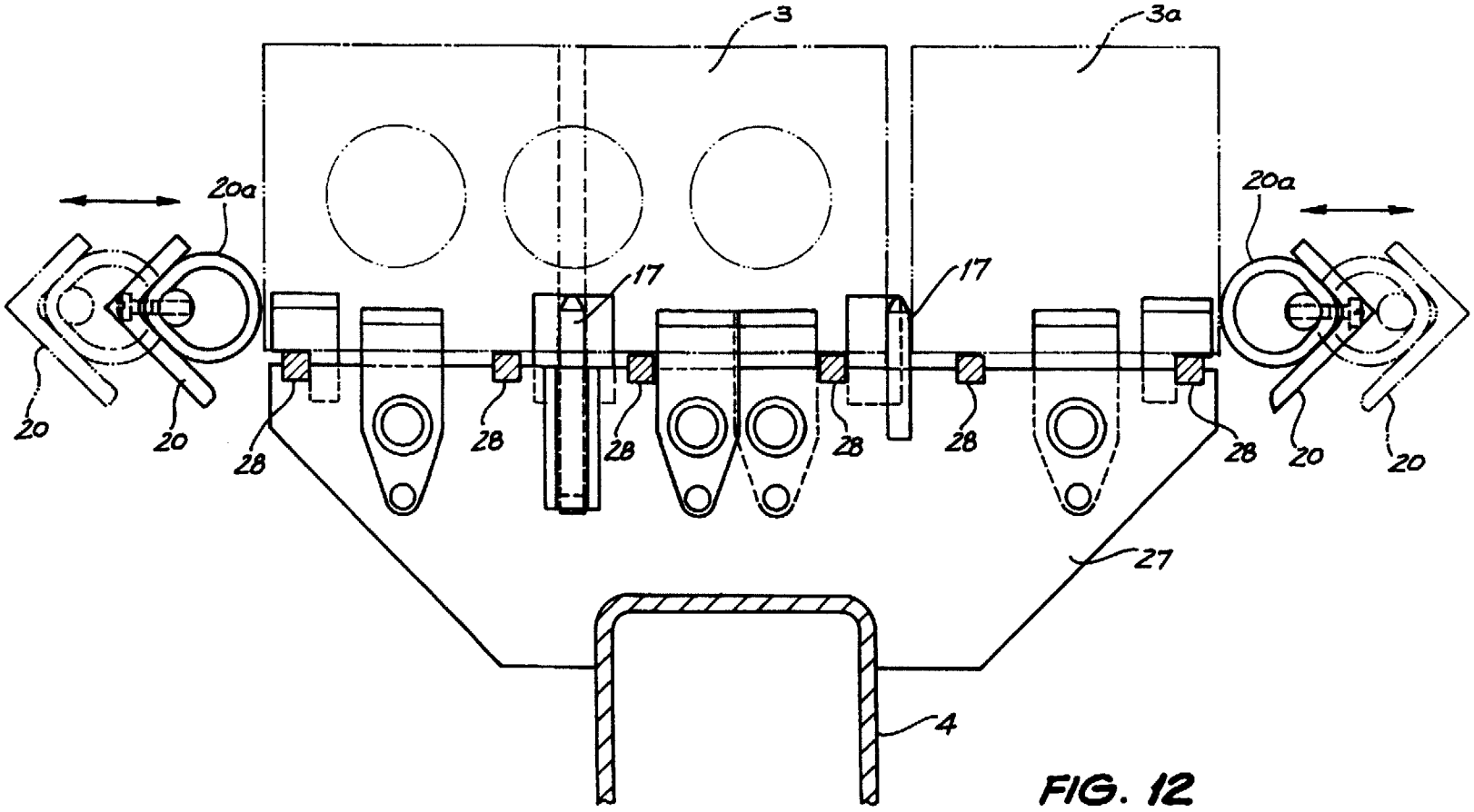
Figure 13:
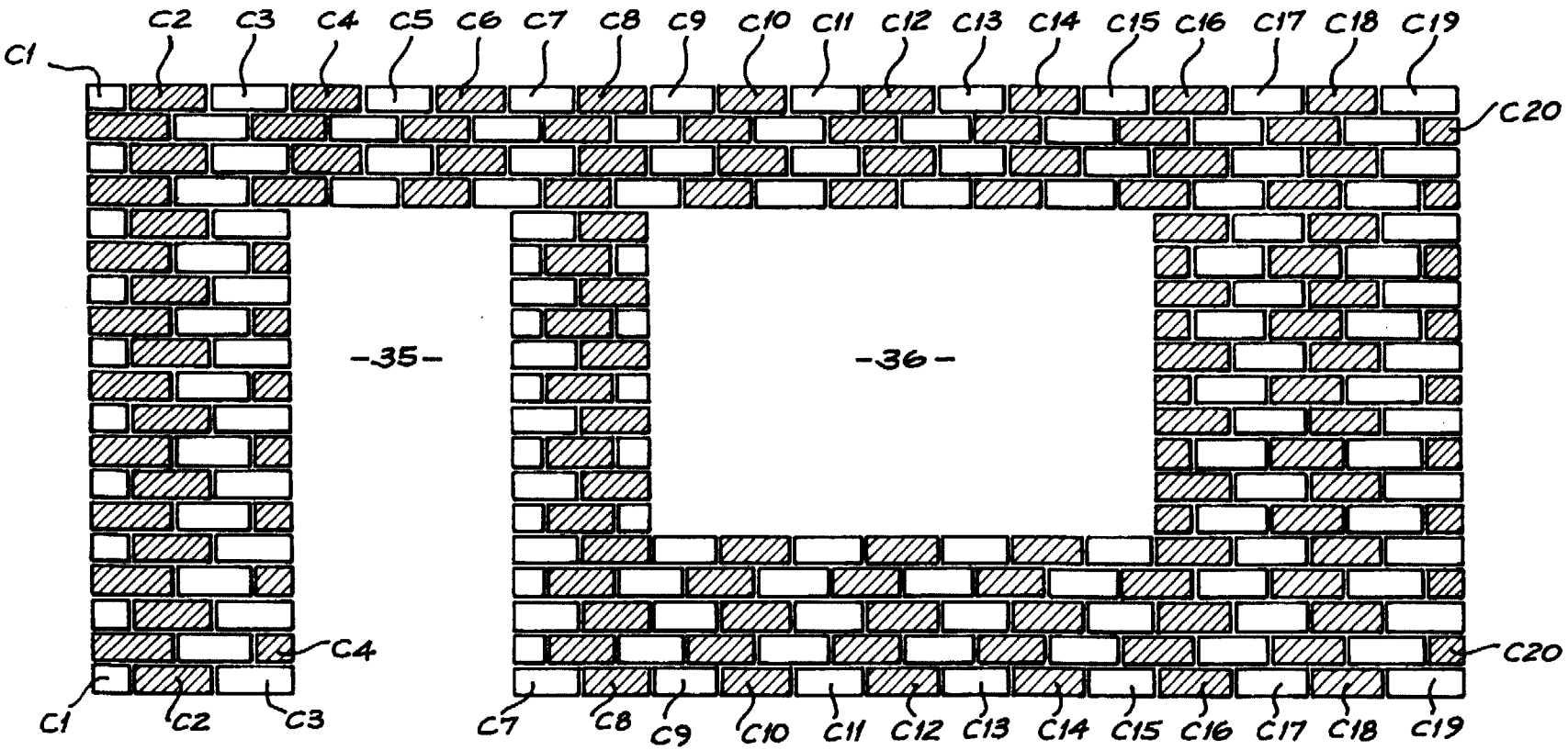

FIG. 6 a part plan view of the brick clamping means where the bricks are oriented parallel with the receptacle (Type 1 receptacle arm);

FIG. 7 is a sectional end elevation of the receptacle arm (Type 1) s the brick clamping means where the bricks are parallel to the axis of the receptacle arm;

FIG. 8 is an isometric view of the brick placing machine bricks oriented at 90° to the receptacle arm (Type 2 receptacle arm);

FIG. 9 is an isometric view of the positioning and brick clamping means when the bricks are oriented at 90° to the receptacle arm (Type 2 receptacle arm);

FIG. 10 is a part plan view showing the means for clamping an positioning the bricks where the bricks are oriented at 90° to the receptacle arm (Type 2);

FIG. 11 is a part elevation of the receptacle arm Type 2) showing the means for clamping and positioning the bricks where they are oriented at 90° to the receptacle arm;

FIG. 12 is sectional end elevation of the receptacle arm showing the positioning and clamping means where the bricks are oriented at 90° to the receptacle arm (Type 2); and FIG. 13 is an elevation of a typical brick panel of approximately storey height with openings and of variable width using a Type 2 receptacle arm showing the interleaving or toothed pattern of each cycle of the brick placing machine.

The brick placing machine described herein consists of three major elements—a horizontal mould in which a brick panel can be found, an indexing carriage and a brick receptacle arm of which there are two interchangeable types. Type 1 is for variable height narrow panels and type 2 is for storey height panels of variable width similar to that shown in FIG. 13.

Figure 1:
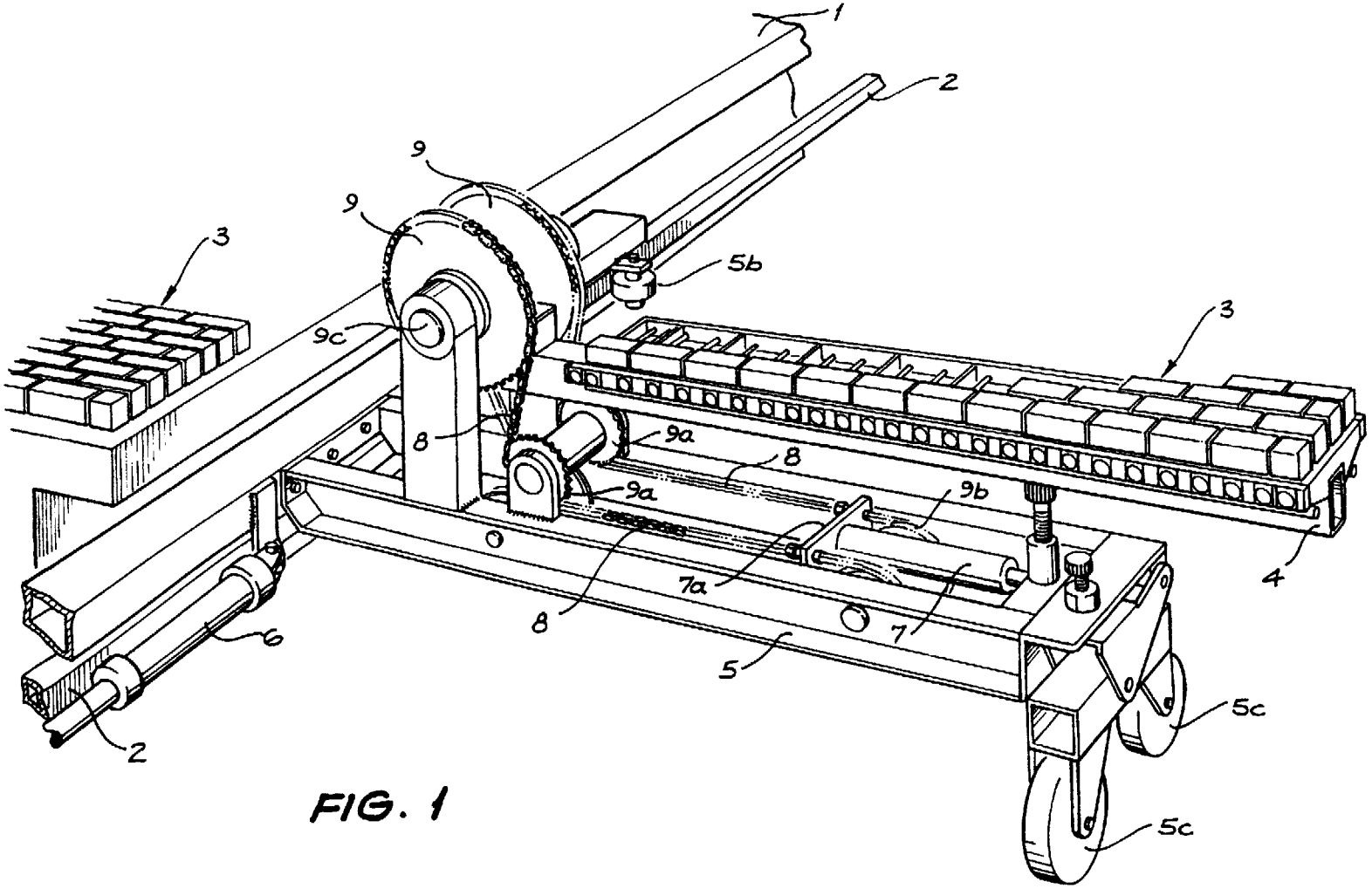
FIG. 1 is an isometric view of a brick placing machine mounted for indexing along a fixed mould with the bricks oriented parallel to the receptacle arm (Type 1 receptacle arm) for placement on the mould, according to the invention.
Figure 2A:
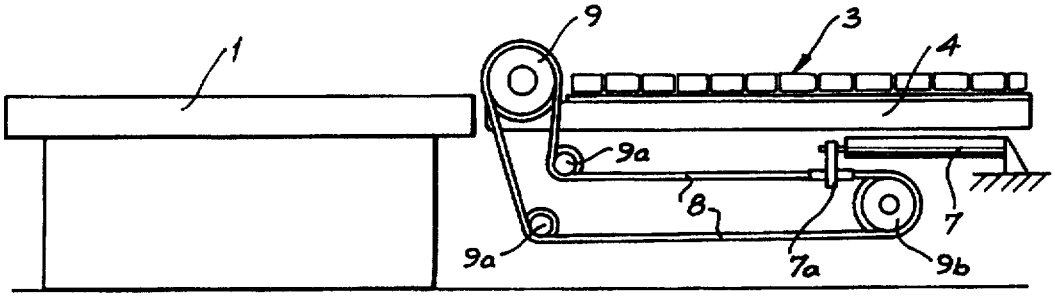
FIG. 2A is an end elevation thereof with the receptacle loaded with bricks.

In FIG. 1 the indexing carriage end receptacle arm as shown adjacent to the mould 1 upon which the bricks 3 are to be positioned. The carriage 5 is positively connected to the carriage beam 5a at one end and supported at the other by the wheels 5c. The carriage beam 5a slides along a guide track 2 that is fixed and parallel to the mould 1. Guide wheels 5b keep it positioned at one end. The other end of the carriage beam 5a is located by a hydraulic cylinder 6 which when activated causes the whole machine to index that is to move a predetermined distance along the mould 1. Also shown is the brick receptacle arm 4 which is connected to the carriage through a bearing 9c. The bearing 9c supports two large sprockets 9 which are in turn connected to two smaller sprockets 9a by two equal length continuous chains 8. The chains 8 are positively connected by a cross bracket 7a to a hydraulic cylinder 7 which is itself attached to the carriage 5. The two continuous chains 8 rotate around two larger sprockets 9b before finally returning around the two large sprockets 9. In FIG. 2A the connections of the retracted hydraulic cylinder 7 and the chains 8 are shown in diagramatic form with the receptacle arm 4 fully loaded ready to place the bricks 3 upon the mould 1.

Figure 2B:
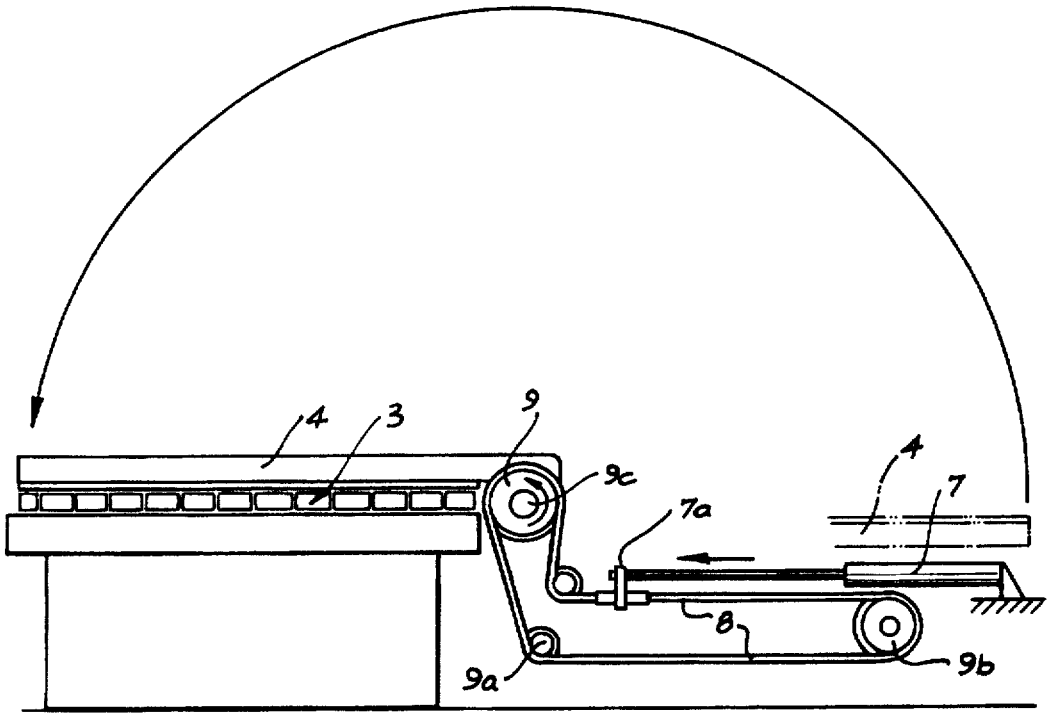
FIG. 2B is a similar end elevation showing the receptacle in the process of placing the bricks upon the mould surface.

In FIG. 2B the action of positioning the bricks 3 upon the mould 1 is described thus. The hydraulic cylinder 7 is activated (extended) which pulls the chains 8 via bracket 7a around sprockets 9b, 9a and 9. The effect of this is to cause the receptacle arm 4 to pivot around the bearings 9c until a position is reached whereby the bricks 3 can be released onto the mould 1. After this the hydraulic cylinder 7 is contracted which returns the receptacle arm 4 to its original position, i.e., resting onto the carriage 5.

Figure 3:
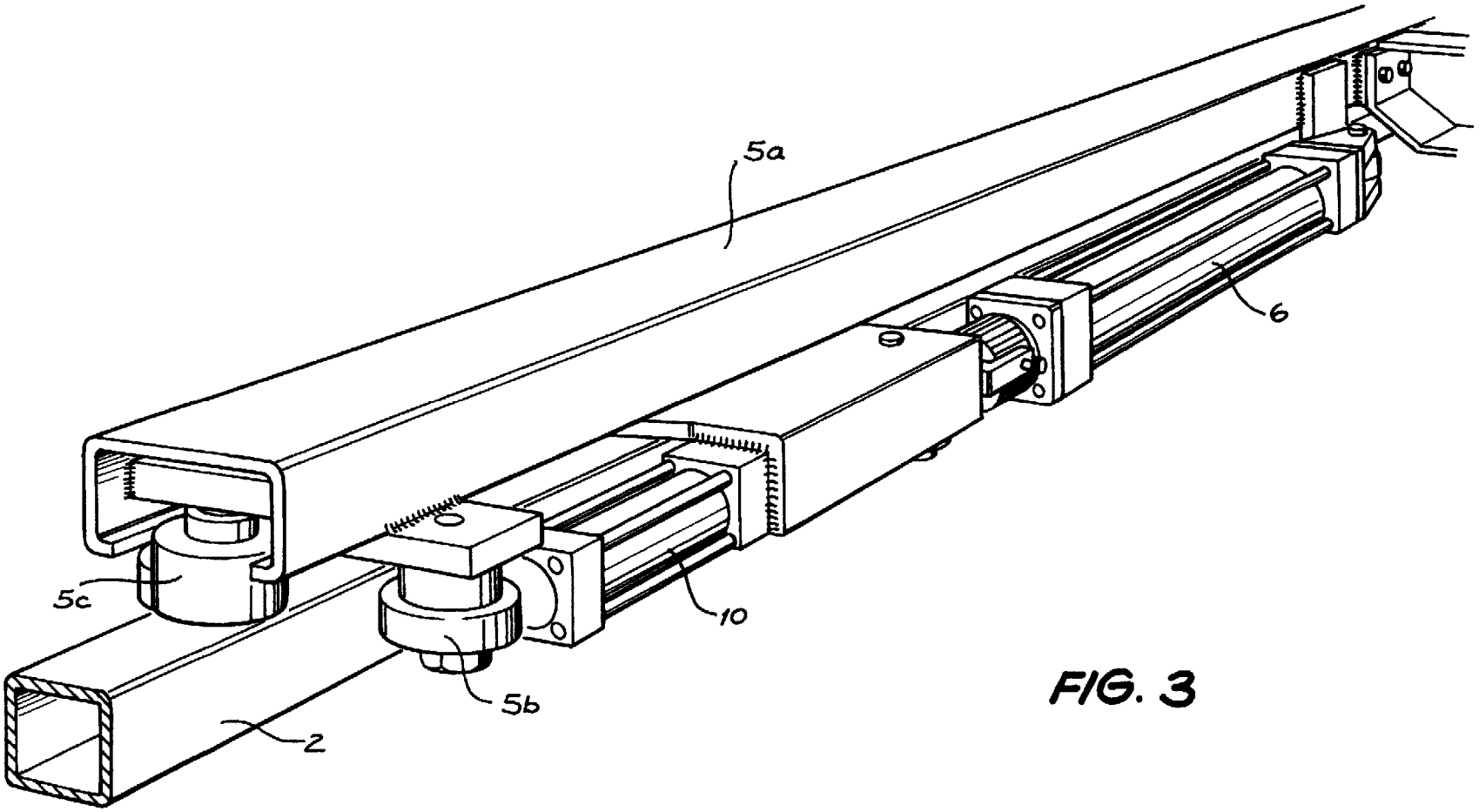
FIG. 3 is a perspective of apparatus for indexing the machine along the mould.

FIG. 3 shows how the carriage beam 5a is supported vertically by means of friction pads 5c at both ends which are positively attached to the beams 5a and slide along the top of guide tracks 2 and are guided horizontally by four guide wheels 5b at both ends of the beam 5a and both sides of the guide track 2.

Figure 4A:
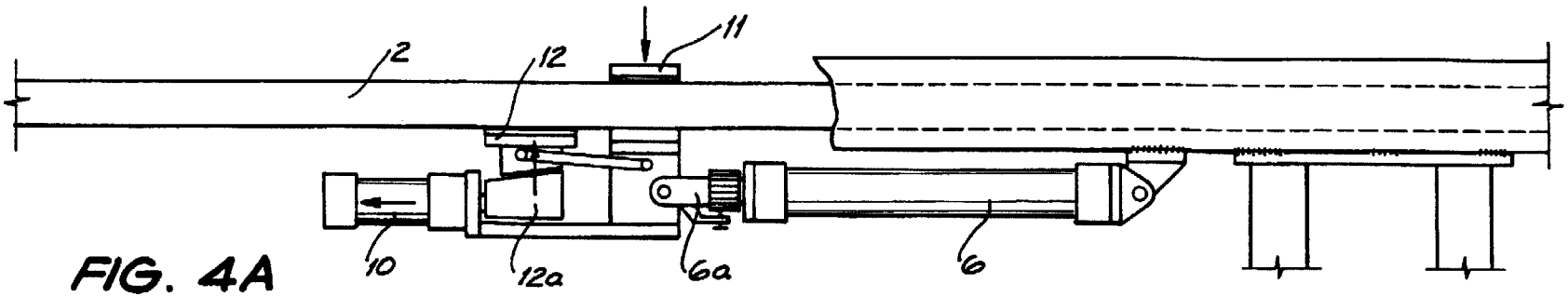
FIG. 4A is an elevation of the apparatus of FIG. 3 in its contracted form and of the device for locking it while in that form.
Figure 4B:
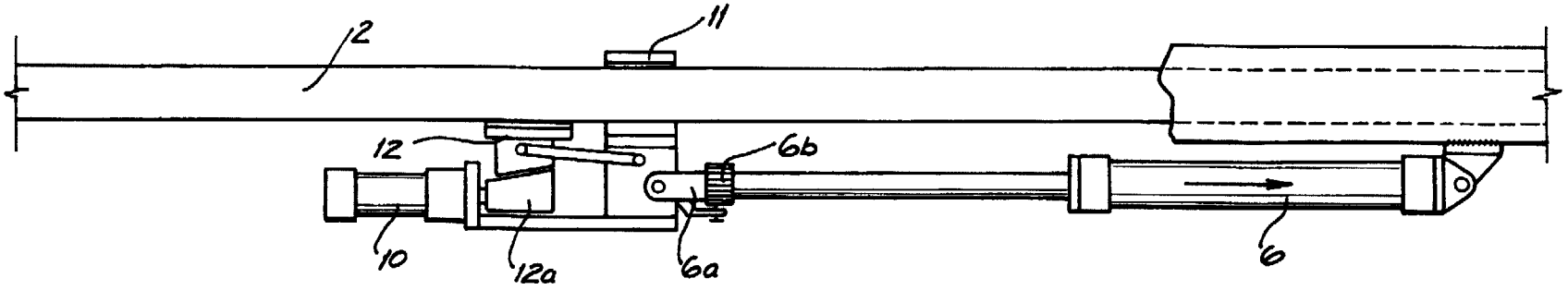
FIG. 4B is another elevation of the apparatus of FIG. 3 in its extended form.
Figure 4C:
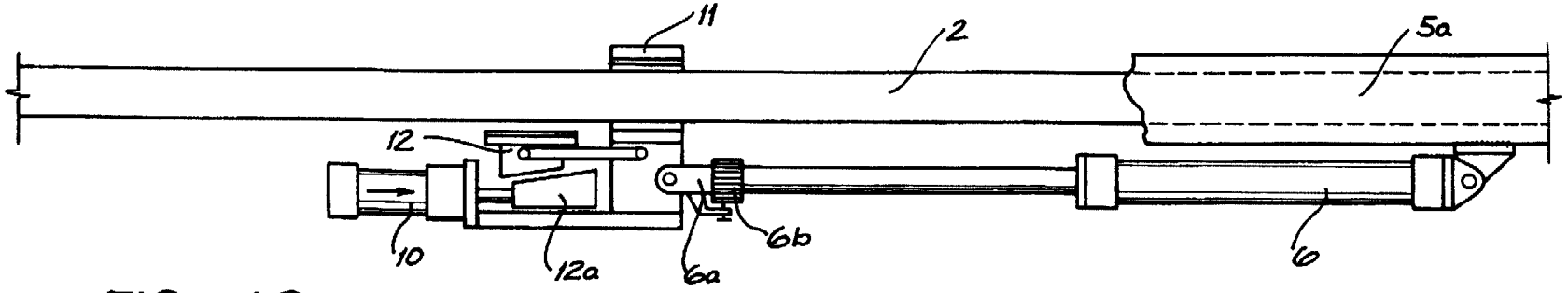
FIG. 4C is an elevation of the apparatus of FIG. 3 in its extended showing the means for releasing the locking device.
Figure 4D:
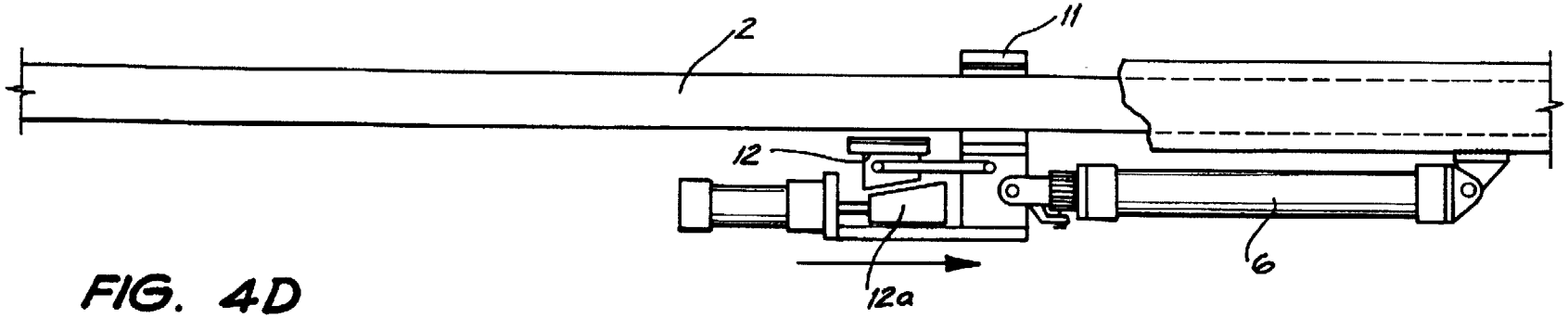
FIG. 4D is an elevation of the apparatus of FIG. 3 in its contracted form with the locking device released.

Also shown is the indexing hydraulic cylinder 6 as well as the locking mechanism activated by a hydraulic cylinder 10. The indexing method is better explained in FIG. 4A where the indexing cylinder 6 is shown in contracted form. Before the indexing cylinder 6 can be activated the end of the indexing cylinder 6a must be locked onto the guide track 2. This is achieved by activating a small hydraulic cylinder 10 which moves its wedge shape head 12a to push a similar wedge shape element 12 vertically and by doing so locks the cylinder end 6a to the guide track 2 by exerting pressure between the wedge shaped element 12 and a corresponding element 11 which is situated on top of the guide track 2. When enough force has been applied to the locking device 12, 12a and 11 by the cylinder 10 then the end of indexing cylinder 6a is firmly locked onto the guide track 2 and then indexing cylinder 6 can be activated or extended FIG. 4B. This has the effect of indexing the whole machine along the mould 1 to the next position. The amount of movement can be adjusted by attaching collar spacers (not shown) externally to the piston of the indexing cylinder 6. When in the required new position attained by the full extension of the hydraulic cylinder 7 the locking device is deactivated by reversing the locking procedure FIG. 4C. The indexing cylinder 6 can be activated to return it to its original contracted position where the cycle can be repeated.

The third major element of the brick placing machine is the receptacle arm 4. The mechanics of the arm itself when positioning bricks on the mould has already been explained However, in order to pivot (FIG. 2B) over, it is obviously necessary that the bricks 3 within the receptacle be firmly held in place in their correct positions and subsequently released onto the mould 1. There are two interchangeable receptacle arms required one for brick orientation at 90° to the mould length (for tall panels) called receptacle arm Type 1 and the second for when the bricks are oriented parallel with the mould (panels of approximately storey height and variable width) called receptacle arm Type 2.

Figure 5:
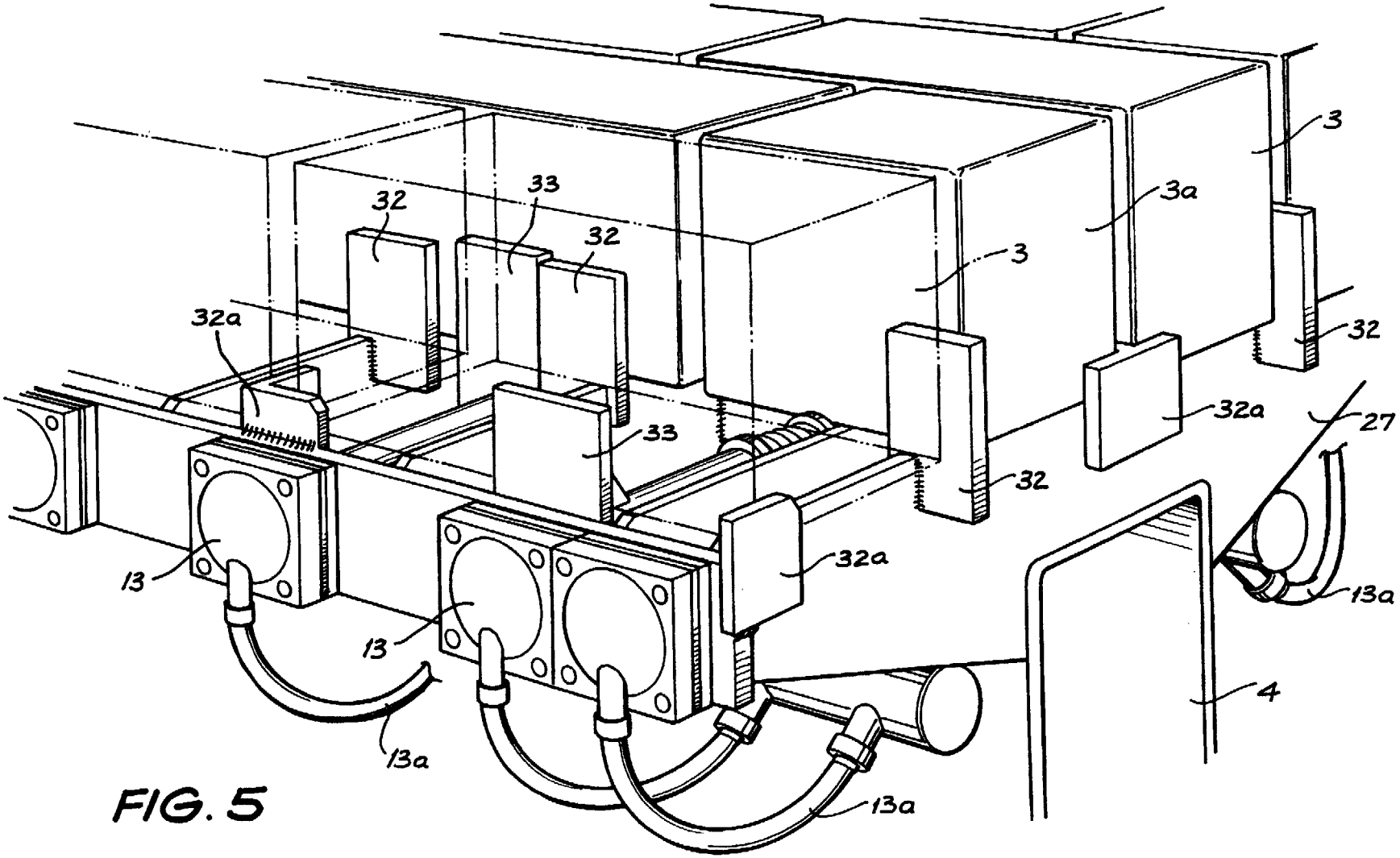
FIG. 5 is an isometric view of bricks being clamped in the receptacle arm (Type 1 receptacle arm)

FIGS. 5, 6 and 7 deal with receptacle arm Type 1, whereas FIGS. 8, 9, 10, 11, 12 and 13 refer to receptacle arm Type 2. Both types are interchangeable on the indexing carriage 5. The only variation between the two arms is that with Type 1 the bricks are oriented parallel to the arm itself and with type 2 the bricks are oriented at 90° to the receptacle arm and are placed in a toothed or staggered bond manner. Obviously the brick clamping means are different for each type of receptacle arm.

Firstly, receptacle arm Type 1. Refer to FIG. 5 which shows the bricks 3 arranged parallel to the axis of receptacle arm 4. The bricks are supported by cross plates 27 welded to the receptacle arm 4. Each brick 3 is clamped separately by moving clamps 33 holding each brick or half brick against two fixed stops 32. To load the receptacle arm 4 the moving clamps 33 must be in the retracted or open position. The operator places the bricks within their various designated positions pushing them up to the longitudinal stops 32a. When this is complete the operator activates the clamping means. This is effected by the use of small air diaphram units 13 (FIG. 7). Air is injected into the diaphram 13 through the port 30. This causes an elastomeric diaphram 31 to push a rod 14 along a spindle 16 until the clamp 33 which is positively connected to the rod 14 presses hard against the bricks 3 (FIG. 5, 6 and 7). The brick 3 is held firmly then against the fixed stops 32 (FIG. 6) by the moving clamp 33.

When the bricks 3 are required to be released onto the mould the air is released from the diaphrams 13 and springs 15 on spindle 16 push clamps 33 back into the retracted position (FIG. 7). The receptacle arm 4 then is pivoted back onto the carriage 5 in its original position and is ready to be reloaded. As can be seen in FIG. 6 half bricks 3a also require a separate clamping means as if they were full size bricks.

With the Type 2 receptacle arm refer to FIGS. 8, 9, 10, 11, 12 and 13.

In FIG. 13 is shown a typical storey height panel with both door 35 and window 36 openings. This type of panel is manufactued with the bricks oriented parallel to the mould 1 which is at 90° to the receptacle arm 4 and the panel is only limited in height by the width of the mould 1 or the length of the receptacle arm 4. On the panel in FIG. 13 there are shown bricks 3 that are shaded in a verticle staggered or toothed pattern. Each vertical (to the panel) toothed pattern represents a cycle of the brick placing machine. To make this panel twenty cycles of the brick placing machine were required C1 to C20 (incl). Cycle No. 1 (C1) represents a requirement of ten half bricks. Cycle No. 2 (shaded) shows that nineteen full bricks were required and so on for each cycle until the panel is completely positioned on the mould to the desired configuration. As can be seen from FIG. 13 it would be a relatively simple matter to program the required cycle sequence.

FIG. 8 shows the brick placing machine indexing along the mould 1. FIG. 8 is identical to FIG. 1 with the exception that the receptacle arm 4 is a Type 2 suitable for the manufacture of panels of the type shown in FIG. 13.

The brick clamping means consists of moving clamps 24 (FIGS. 9, 10 and 11). There are two moving clamps 24 for each brick 3 or one for each half brick and these clamps 24 hold a full brick 3 against three fixed stops 24b (FIG. 10) or two fixed stops 24b in the case of half bricks. The bricks 3 and half bricks 3a are supported by longitudinal steel bars 28. Before the moving clamps 24 are activated, however, the bricks 3 and 3a are placed within a designated position and prior to clamping are positioned in the other direction by the side positioners 20 (FIG. 12) which consist of a rigid angle to which is fixed a flexible hollow rubber hose 20a. The side positioner 20 is activated by a lever (not shown) and pushes the bricks against the fixed stops 24c (FIG. 10). In the case of half bricks 3a (FIG. 12) the side positioner 20 pushes these up against retractable stops 17. These stops 17 are spring loaded and therefore when a full brick 3 is placed in the receptacle the weight o the full brick 3 pushes the stops 17 down and they become inactive as they are only required when a half brick 3a is used (FIG. 12).

The moving clamps 24 are positively attached to four long shafts 22 that run the full length of the receptacle arm 4. Each clamp 24 pushes against the brick 3 and holds it by the action of a spring 23. The spring 23 is covered by a protective sheath 25 to prevent pieces of brick interfering with the spring action.

In order to release the claps 24 the long shafts 22 of which there are four are activated by two air cylinders 18 at either end of the receptacle arm 4 which depress the springs 23 and release the bricks 3 or half bricks 3a.

The Type 2 receptacle arm therefore clamps the bricks 3 by spring action and uses the air cylinder 18 to hold the springs 23 depressed for loading and releasing. However, it is a matter of choice as to whether spring action or air pressure is used to hold and clamp the bricks in place in either type of receptacle arm 4.

The type 2 receptacle arm has another distinct advantage in that the bulk of the steel reinforcing (not shown) required for the brick panels can be inserted whilst the bricks 3 are clamped in the receptacle arm 4 prior to placement of the bricks 3 on the mould 1. This greatly reduces the risk of brick dislocation on the mould when the reinforcing is inserted through the holes in the bricks.

In order to make the machine operator's task simpler it would be relatively easy to program the right sequence of bricks and half bricks in the receptacle by mans of a series of coloured lights positioned in the receptacle itself. The relevant colour would indicate to the operator whether to use a full brick, a half brick or no brick at all, thus accelerating the cycle times.

It should be noted that the preferred method of indexing is for the brick placing machine to be mobile. However, it would be quite possible in certain circumstances for the mould to move and index along in front of a stationary brick placing machine. The amount of index movement is different for Type 1 receptacle arm as against Type 2 receptacle arm, as they are placing bricks in a different orientation. Therefore the indexing means must be finitely variable.

Another important advantage of this type of machine is that the receptacle is away from the mould and can be conveniently loaded from both sides of the receptacle by as many operators as is practical.

This significantly accelerates the brick placing part of the overall panel manufacturing process. It would be possible for instance for a machine to have more than one receptacle arm.

The bricks required for loading would travel on a platform attached to the machine itself. A very important feature of this machine is that the bricks when loaded are "face up" so that visual inspection is both simple and easy.

It is imperative that the bricks are held or clamped from the back in order that they are placed face down onto the mould surface. This machine achieves this by a pivot action which is the preferred method. However, other mechanical designs could be devised which would achieve the preferred "face up" loading and "face down" placement of the bricks on the mould.

It would also be possible to mechandise the brick loading of the receptacle. However, it is considered that it would always be necessary to inspect the face of the bricks prior to placement on the mould.

We claim:

1. A brick placing machine, comprising:

a receptacle having a length substantially corresponding to a maximum width or height of a brick panel to be formed;

a mold adjacent said receptacle on which said brick panel can be formed, wherein said mold receives a plurality of bricks which make up said brick panel, and wherein said plurality of bricks are arranged on said receptacle in a configuration in which said bricks are to be placed on said mold;

brick locating means for positioning each brick in a predetermined position on said receptacle so as to provide spaces between said bricks, wherein said spaces between said bricks receive mortar;

brick clamping means for holding said bricks on said receptacle in said predetermined positions;

a first receptacle moving means for moving said receptacle along a side of said mold;

a second receptacle moving means for moving said receptacle from a first position to a second position over said mold; and brick releasing means for releasing said bricks from said receptacle to said mold in said predetermined positions, wherein said second receptacle moving means moves said receptacle from said second position over said mold to said first position after said bricks are released onto said mold, and wherein said receptacle can be refilled with additional bricks when said receptacle is on said first position.

2. The brick placing machine as in claim 1, wherein said receptacle receives said bricks with a finished face for each of said bricks facing upwards, and wherein said receptacle moving means inverts said bricks when moving from said first position to said second position over said mold so as to have said finished face for each of said bricks rests on said mold when said bricks are released by said brick releasing means from said receptacle.

3. The brick placing machine as in claim 2, wherein said brick clamping means equally clamps each brick or a portion thereof regardless of dimensional differences between said bricks.

4. The brick placing machine as in claim 3, further comprising retractable end stops on said receptacle so as to ensure proper positioning of half bricks on said receptacle.

5. The brick placing machine as in claim 1, wherein one end of said receptacle is pivotally mounted about a pivotal axis on a carriage, wherein said receptacle receives said bricks with a finished face for each of said bricks facing upwards, and wherein said receptacle moving means pivots said receptacle about said pivotal axis and inverts said bricks when moving from said first position to said second position over said mold so as to have said finished face for each of said bricks rests on said mold when said bricks are released by said brick releasing means from said receptacle.

6. The brick placing machine as in claim 1 or claim 2, wherein said receptacle is one of a first receptacle and a second receptacle, wherein said first and second receptacles are interchangeable, wherein said first receptacle receives said bricks in such a manner that said bricks are parallel to a principal axis of said receptacle, and wherein said second receptacle receives said bricks in such a manner that said bricks are perpendicular to said principal axis of said receptacle.

7. The brick placing machine as in claim 1 or claim 2, wherein said first receptacle moving means comprises a track coupled to a carriage which supports said receptacle, a longitudinal member which slides along said track, a hydraulic jack operably coupled to said longitudinal member, actuating means for clamping said longitudinal member onto said track, wherein an extension of said jack moves said receptacle relative to said mold to a position, and wherein a contraction of said jack, upon release of the clamping of said longitudinal member from said track, moves said receptacle relative to said mold to another position.

* * * * *